(12) United States Patent
Motgi et al.

(10) Patent No.: US 12,282,489 B2
(45) Date of Patent: Apr. 22, 2025

(54) SYSTEM AND METHOD FOR ENRICHMENT OF STORED DATA

(71) Applicant: Dell Products L.P., Round Rock, TX (US)

(72) Inventors: Prem Pradeep Motgi, Austin, TX (US); Dharmesh M. Patel, Round Rock, TX (US); Manpreet Singh Sokhi, Santa Clara, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/458,395

(22) Filed: Aug. 30, 2023

(65) Prior Publication Data

US 2025/0077535 A1    Mar. 6, 2025

(51) Int. Cl.
*G06F 16/2457* (2019.01)
*G06F 16/2458* (2019.01)

(52) U.S. Cl.
CPC .... *G06F 16/2477* (2019.01); *G06F 16/24578* (2019.01)

(58) Field of Classification Search
None
See application file for complete search history.

(56) References Cited

U.S. PATENT DOCUMENTS

| 5,649,060 | A  | 7/1997  | Ellozy et al. |
| 6,606,620 | B1 | 8/2003  | Sundaresan |
| 8,117,235 | B1 | 2/2012  | Barta |
| 8,255,386 | B1 | 8/2012  | Annau et al. |
| 8,255,948 | B1 | 8/2012  | Black et al. |
| 8,335,688 | B2 | 12/2012 | Yegnanarayanan et al. |
| 8,412,521 | B2 | 4/2013  | Mathias et al. |
| 8,495,720 | B2 | 7/2013  | Counterman |

(Continued)

FOREIGN PATENT DOCUMENTS

| CN | 202058147 U  | 11/2011 |
| CN | 115292285 A  | 11/2022 |

(Continued)

OTHER PUBLICATIONS

Balaskas, Georgios, et al., "An end-to-end system for transcription, translation, and summarization to support the co-creation process. A Health Cascade Study", ACM PETRA '23, published Aug. 10, 2023, pp. 625-631. (Year: 2023).*

(Continued)

*Primary Examiner* — Scott A. Waldron
(74) *Attorney, Agent, or Firm* — WOMBLE BOND DICKINSON (US) LLP

(57) ABSTRACT

Methods and systems for managing and use of data are disclosed. To manage data, the data may be classified with respect to topics that are relevant to a user of a data storage system. The topics that are relevant to the user may be identified based on digital recordings of conversations between the user and other persons. Over time, the topics that are relevant to the user may change. The changes in relevant topics may be used to identify occurrences of different events in the user's life. These life events and data classified for corresponding topics may be used to service information request by providing context for the data and a means of discriminating more relevant from less relevant data.

20 Claims, 10 Drawing Sheets

(56) References Cited

U.S. PATENT DOCUMENTS

| | | | |
|---|---|---|---|
| 9,031,839 B2 | 5/2015 | Thorsen et al. | |
| 9,361,428 B2 | 6/2016 | Bessette | |
| 9,571,890 B1 * | 2/2017 | Diamondstein | H04N 21/25891 |
| 9,781,097 B2 | 10/2017 | Grajek et al. | |
| 10,042,993 B2 | 8/2018 | Beigi | |
| 10,073,948 B2 | 9/2018 | Cohen et al. | |
| 10,157,275 B1 | 12/2018 | Venkatasamy et al. | |
| 10,462,142 B2 | 10/2019 | Pattar et al. | |
| 10,701,056 B2 | 6/2020 | Murthy | |
| 10,896,681 B2 | 1/2021 | Aleksic et al. | |
| 10,904,237 B2 | 1/2021 | Murthy et al. | |
| 11,010,392 B1 | 5/2021 | Hirsch et al. | |
| 11,094,402 B2 | 8/2021 | Brown et al. | |
| 11,217,331 B2 | 1/2022 | Vishnubhatla et al. | |
| 11,405,189 B1 | 8/2022 | Bennison | |
| 11,631,401 B1 | 4/2023 | Nudd | |
| 11,763,821 B1 | 9/2023 | McNair | |
| 11,849,069 B1 | 12/2023 | Can | |
| 12,135,708 B2 | 11/2024 | Chermside | |
| 2003/0046401 A1 | 3/2003 | Abbott | |
| 2005/0160166 A1 | 7/2005 | Kraenzel | |
| 2008/0154961 A1 | 6/2008 | Dougall | |
| 2008/0275701 A1 | 11/2008 | Wu et al. | |
| 2009/0171692 A1 | 7/2009 | Zilberman et al. | |
| 2010/0169304 A1 | 7/2010 | Hendricksen et al. | |
| 2011/0131174 A1 | 6/2011 | Birch et al. | |
| 2012/0265771 A1 | 10/2012 | Suh | |
| 2014/0181673 A1 | 6/2014 | Work | |
| 2014/0201199 A1 | 7/2014 | Hajaj | |
| 2014/0207885 A1 | 7/2014 | Baker et al. | |
| 2014/0344288 A1 | 11/2014 | Evans | |
| 2015/0169574 A1 * | 6/2015 | Bau | G06F 16/5866 707/E17.014 |
| 2015/0199268 A1 | 7/2015 | Davis et al. | |
| 2015/0356127 A1 * | 12/2015 | Pierre | G06F 16/951 707/706 |
| 2016/0006839 A1 | 1/2016 | Sawazaki | |
| 2016/0164813 A1 | 6/2016 | Anderson | |
| 2016/0231928 A1 | 8/2016 | Lewis et al. | |
| 2016/0232159 A1 | 8/2016 | Parikh | |
| 2016/0306812 A1 | 10/2016 | McHenry et al. | |
| 2016/0378760 A1 * | 12/2016 | Braz | G06Q 50/01 707/728 |
| 2017/0013047 A1 | 1/2017 | Hubbard | |
| 2017/0018026 A1 | 1/2017 | Rigdon | |
| 2017/0262164 A1 | 9/2017 | Jain | |
| 2017/0365101 A1 | 12/2017 | Samec et al. | |
| 2018/0024845 A1 | 1/2018 | Card, II et al. | |
| 2018/0121502 A1 | 5/2018 | Prieur | |
| 2018/0189352 A1 | 7/2018 | Ghafourifar | |
| 2018/0203612 A1 | 7/2018 | Kats et al. | |
| 2018/0225345 A1 | 8/2018 | Gilder | |
| 2019/0012931 A1 | 1/2019 | Candelore | |
| 2019/0279744 A1 | 9/2019 | Howley et al. | |
| 2019/0297035 A1 | 9/2019 | Fox et al. | |
| 2019/0325036 A1 | 10/2019 | Edge | |
| 2020/0043479 A1 | 2/2020 | Mont-Reynaud | |
| 2020/0110882 A1 | 4/2020 | Ripolles Mateu et al. | |
| 2020/0226216 A1 | 7/2020 | Marin et al. | |
| 2020/0258516 A1 | 8/2020 | Khaleghi | |
| 2021/0056131 A1 * | 2/2021 | Ackermann | G06F 16/383 |
| 2021/0065203 A1 | 3/2021 | Billigmeier et al. | |
| 2021/0256534 A1 | 8/2021 | An | |
| 2021/0390196 A1 | 12/2021 | Lavine et al. | |
| 2022/0027859 A1 * | 1/2022 | Daga | G06Q 10/1095 |
| 2022/0261152 A1 | 8/2022 | Jude et al. | |
| 2022/0293087 A1 | 9/2022 | Kumar | |
| 2022/0334719 A1 | 10/2022 | Thrane | |
| 2022/0366131 A1 | 11/2022 | Ekron | |
| 2023/0029634 A1 | 2/2023 | Teeple | |
| 2023/0058470 A1 | 2/2023 | Chandrashekar et al. | |
| 2023/0061725 A1 | 3/2023 | Khan | |
| 2023/0068099 A1 | 3/2023 | Abramenko et al. | |
| 2023/0137931 A1 | 5/2023 | Song | |
| 2023/0156085 A1 | 5/2023 | Yachiku | |
| 2023/0221911 A1 | 7/2023 | Bandameedipalli | |
| 2024/0112597 A1 | 4/2024 | Kim | |
| 2024/0248592 A1 | 7/2024 | Zerhusen | |

FOREIGN PATENT DOCUMENTS

| | | |
|---|---|---|
| JP | 4808173 B2 | 11/2011 |
| JP | 2015-106406 A | 6/2015 |
| WO | 2023/220948 A1 | 11/2023 |

OTHER PUBLICATIONS

Page, Sébastien, "How to move your Health data from one iPhone to another," iDB, Web Page <https://www.idownloadblog.com/2016/10/13/health-data-importer-makes-moving-your-health-data-from-one-iphone-to-another-a-breeze/> accessed on Oct. 30, 2022 (9 Pages).

"MyChart," Web Page <https://www.mychart.org/> accessed on Oct. 30, 2022 (6 Pages).

Xu, Jie et al., "Federated learning for healthcare informatics," Journal of Healthcare Informatics Research 5 (2021): 1-19. (19 Pages).

Naz, Sadaf et al., "A comprehensive review of federated learning for COVID-19 detection," International Journal of Intelligent Systems 37.3 (2022): 2371-2392. (22 Pages).

Prasser, Fabian, et al., "Efficient and effective pruning strategies for health data de-identification," BMC medical informatics and decision making 16.1 (2016): 1-14. (14 Pages).

"Speech Recognition," Web Accessibility Initiative. Web Page <https://www.w3.org/WAI/perspective-videos/voice/> accessed on Aug. 30, 2023 (6 Pages).

"Text Size," Web Accessibility Initiative. Web Page <https://www.w3.org/WAI/GL/low-vision-a11y-tf/wiki/Text_Size> accessed on Aug. 30, 2023 (5 Pages).

Mesko, Bertlan, "The Top 10 Health Chatbots," The Medical Futurist, Aug. 1, 2023, Web Page <https://medicalfuturist.com/top-10-health-chatbots/> accessed on Aug. 30, 2023 (11 Pages).

Longoni, Chiara et al., "AI Can Outperform Doctors. So Why Don't Patients Trust It?" Harvard Business Review, Oct. 30, 2019, Web Page <https://hbr.org/2019/10/ai-can-outperform-doctors-so-why-dont-patients-trust-it> accessed on Aug. 30, 2023 (7 Pages).

"Doctor Ai," DDXRX, Web Page <https://www.ddxrx.com/> accessed on Aug. 30, 2023 (7 Pages).

"Multi-Factor Authentication and Voice Biometrics," Voice Biometrics Group, Feb. 2021, Web Page <https://www.voicebiogroup.com/starting/multi-factor-authentication-and-voice-biometrics.html> accessed on Aug. 30, 2023 (6 Pages).

Wallace, Byron C et al. "Automatically annotating topics in transcripts of patient-provider interactions via machine learning." Medical decision making : an international journal of the Society for Medical Decision Making vol. 34,4 (2014): 503-12. doi:10.1177/0272989X13514777 (20 Pages).

"Medical Transcription Analysis with Machine Learning—Doctor/Patient Conversation Demo, "Amazon Web Services, Jun. 16, 2021, Web Page <https://www.youtube.com/watch?v=f5HVIALG5g4> accessed on Aug. 30, 2023 (2 Pages).

Baxendale, Simran et al., "Performing medical transcription analysis with Amazon Transcribe Medical and Amazon Comprehend Medical," Amazon Web Services, May 8, 2020, Web Page <https://aws.amazon.com/blogs/machine-learning/performing-medical-transcription-analysis-with-amazon-transcribe-medical-and-amazon-comprehend-medical/> accessed on Aug. 30, 2023 (12 Pages).

Sullivan, Todd et al., "Speaker Identification and Geographical Region Prediction in Audio Reviews," Department of Computer Science, Stanford University, 2023 (4 Pages).

"Finding Local Destinations with Siri's Regionally Specific Language Models for Speech Recognition," Apple Machine Learning Research, Aug. 2018, Web Page <https://machinelearning.apple.com/research/regionally-specific-language-models> accessed on Aug. 30, 2023 (9 Pages).

Tyagi, Nemika et al., "Demystifying the Role of Natural Language Processing (NLP) in Smart City Applications: Background, Moti-

(56) References Cited

OTHER PUBLICATIONS vation, Recent Advances, and Future Research Directions." Wireless Personal Communications 130.2 (2023): 857-908. (52 Pages).

Alozie, Emeka, "The AI Surgeon's Assistant: How Generative AI is Revolutionizing the Operating Room," Apr. 20, 2023, Web Page <https://intuitivex.com/tpost/p7bhza9611-the-ai-surgeons-assistant-how-generative> accessed on Aug. 30, 2023 (9 Pages).

Gaitan, Michelle, "Researchers at UTSA use artificial intelligence to improve cancer treatment," University of Texas at San Antonio, Apr. 18, 2023, Web Page <https://www.utsa.edu/today/2023/04/story/researchers-use-artifical-intelligence-to-improve-cancer-treatments.html> accessed on Aug. 30, 2023 (4 Pages).

Bohr, Adam et al., "The rise of artificial intelligence in healthcare applications." Artificial Intelligence in Healthcare (2020): 25-60. doi:10.1016/B978-0-12-818438-7.00002-2 (37 Pages).

"Introducing Healthcare-Specific Large Language Models from John Snow Labs," KDnuggets, Apr. 28, 2023, Web Page <https://www.kdnuggets.com/2023/04/john-snow-introducing-healthcare-specific-large-language-models-john-snow-labs.html> accessed on Aug. 30, 2023 (7 Pages).

D. Fedasyuk and I. Lutsyk, "Tools for adaptation of a mobile application to the needs of users with cognitive impairments," 2021 IEEE 16th International Conference on Computer Sciences and Information Technologies (CSIT), LVIV, Ukraine, 2021, pp. 321-324, doi: 10.1109/CSIT52700.2021.9648702. (Year: 2021).

"FollowMyHealth®," Allscripts Healthcare Solutions Inc, Google Play Store, Web Page <https://play.google.com/store/apps/details?id=com.jardogs.fmhmobile&hl=en_US&gl=US> accesed on Jan. 8, 2023 (4 Pages).

\* cited by examiner

SYSTEM AND METHOD FOR ENRICHMENT OF STORED DATA

FIELD

Embodiments disclosed herein relate generally to storage management. More particularly, embodiments disclosed herein relate to systems and methods to manage storage of data in a set of storage tiers.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
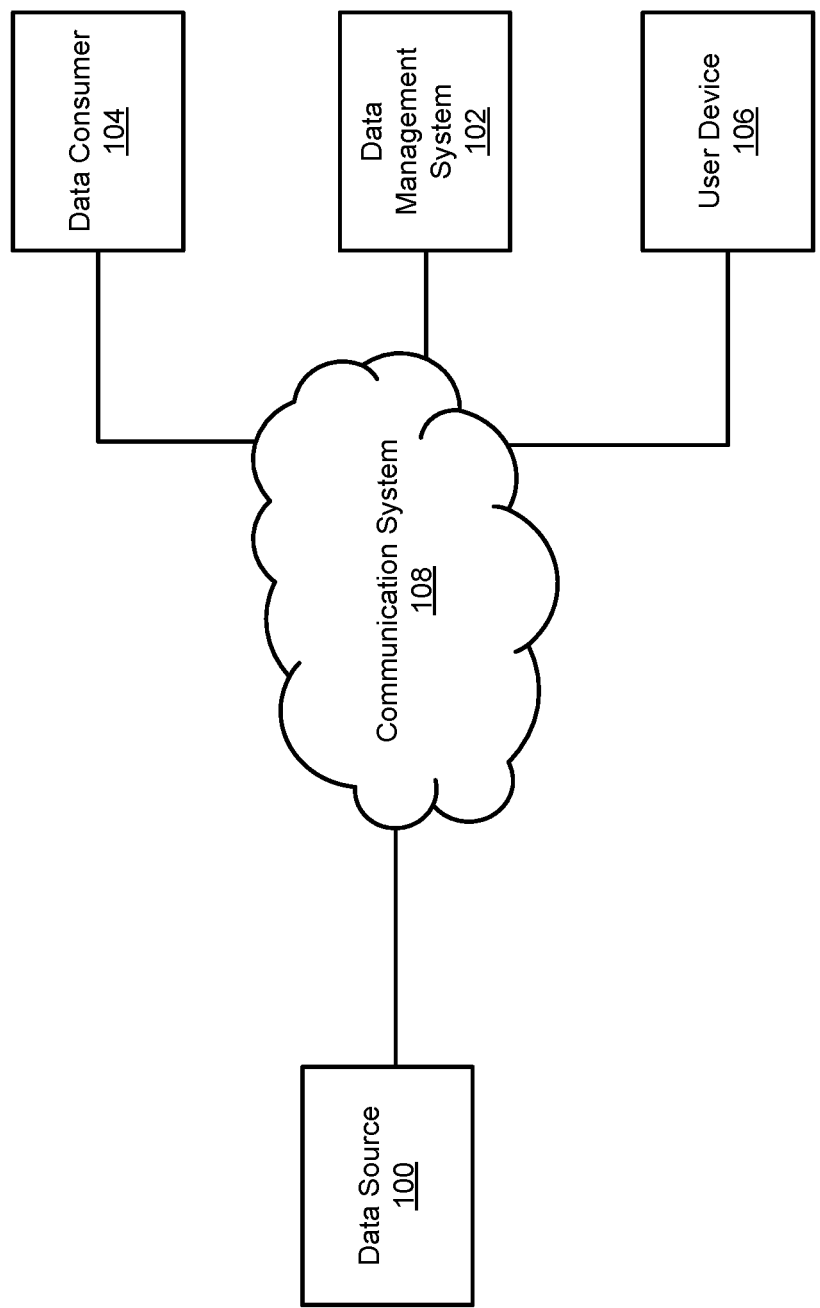
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing storage and use of data. The data may be usable, for example, by (i) an individual for which the data is regarding, and (ii) other individuals to assist the individual. For example, the data may include medical information for an individual and the data may be usable by other individuals such as healthcare providers to diagnose and/or treat the individual for various medical conditions.

To manage the data, a data management system may identify topics relevant for a user of the data management system, and a relevancy ranking for each topic for the user. The topics and relevancy rankings may be established based on conversations between the user and other persons.

Over time, the topics and relevancy rankings may change based on various conversations between the user and other persons. The changing topics and relevancy rankings may be used to identify occurrences of different events in the life of the person. To provide context for various portions of data stored in the data management system, different portions of data may be associated with the life events.

For example, when data obtained by the data management system, the data may be classified with respect to the topics. Data classified for each topic may be associated with life events in the person's life based on the topics (upon which the life events are based).

The timeline may be used to identify portions of data that may be used for various purposes, and to provide context for the portions of data. For example, when requests for information are obtained, search terms from the requests may be used to identify life events from the timeline. The portions of data associated with the identified life events along with the life events themselves may be used to service the information requests.

In an embodiment, a method for managing use of data in a storage system is provided. The method may include obtaining an information request; identifying at least one portion of the data that is relevant to the information request using, at least in part, a timeline that associate portions of the data with past life events related to a user of the storage system; and using the at least one portion of the data to service the information request.

The timeline may include an entry for one of the past life events, and the entry may include: time data for the one past life event; and identifiers of a sub-portion of the portions of the data.

The time data may be based on at least two relevancy snapshots that are each associated with different points in time.

A first of the at least two relevancy snapshots may include topics, and relevancy rankings for the topics.

The topics may be based at least in part on an audio transcript, the audio transcript may be based on an audio file, the audio file may include audio data based on a conversation between two people, and the user may be one of the two people.

The topics may include an enumeration of each unique topic of discussion topics during the conversation.

The relevancy rankings may be based on a number of time each topic occurred during the conversation.

The one past life event may be based on the at least two relevancy snapshots, and the time data specifies a period of time based on the different points in time.

The information request may include a search query, and the search query may be used to discriminate at least one of the past life events during the identifying of the at least one portion of the data.

The timeline may be based on at least two audio recordings of conversations, the data may be classified with respect to topics, and at least a portion of the topics may be based on life information for the user obtained from the at least two audio records.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer-implemented services may include data management services, data storage services, data access and control services, database services, and/or any other type of service that may be implemented with a computing device.

The system may include data management system 102. Data management system 102 may provide all, or a portion, of the computer-implemented services. To provide the computer-implemented services, data may be stored in data management system 102. The data stored in data management system 102 may include data usable (i) by an individual for which the data is stored, (ii) by other individuals to assist the individual, and/or (iii) by other individuals for other types of use. For example, the data may include healthcare information for an individual and the data may be usable by other individuals such as healthcare providers to diagnose and/or treat the individual for various health conditions.

The data stored in data management system 102 may be collected from data source 100. While illustrated with respect to a single data source, the system of FIG. 1 may include any number of data sources through which data management system 102 may obtain data. Data source 100 may include hardware and/or software components configured to obtain data, store data, provide data to other entities, and/or to perform any other task to facilitate performance of the computer-implemented services.

For example, an individual's healthcare information may be obtained from a healthcare provider system (e.g., data source 100) for use by the individual and/or other individuals (via associated devices). The data collected from data source 100 may include any quantity, size, and type of data. The data may include, for example, an audio recording (e.g., audio file) of a conversation between an individual and a healthcare provider, digitized results of medical tests, etc.

By storing data in data management system 102, the aggregated data may be usable for a variety of purposes. For example, in the healthcare context, the data may be usable for diagnostic purposes, verification purposes (e.g., second opinions), to facilitate studies by third parties that may use the data, etc. While described with respect to the healthcare services context, it will be appreciated that data may be stored in data management system 102 for other purposes and/or with respect to other contexts. For example, the stored data may be relevant for other types of services, uses, etc. without departing from embodiments disclosed herein.

However, while storing data in data management system 102 may make the data usable for various purposes in the future, large amount of data may be stored and all of the data may not be relevant for different purposes. For example, some data may be relevant for certain types of diagnosis purposes such as to diagnose a cause of abdominal pain while other data may be relevant for other types of diagnosis purposes such as to diagnose a cause of leg pain. Further, while the data may be relevant for various purposes, the data may not be self-describing regarding the original purposes for which it was obtained. For example, an x-ray of the abdominal portion of a person's body may be usable for a wide variety of diagnostic purposes. Thus, the x-ray itself may not provide context for which it was previously obtained.

In general, embodiments disclosed herein may provide methods, systems, and/or devices for managing use of data in data management systems. The data may be managed in a manner that enables relevant data for a variety of purposes to be identified. To enable stored data to be used for a variety of purposes, data management system 102 may enhance the stored data by (i) automatically identifying occurrences of life events in a person's life (e.g., and for which data management system 102 stores data for the person), and (ii) facilitate identification of portions of data stored in data managements system 102 that are related to these life events. Consequently, when the data is used in the future, the context for which the data was originally obtained may be used to enrich the data, for example, for search and discrimination purposes.

To facilitate identification of portions of data, data management system may maintain a timeline of life events for the person, and portions of stored data associated with these life events. The life events for the person may be identified in an automated manner based on conversations between the person and other persons. Portions of data obtained to manage the life events may associated with the life events in the timeline to facilitate future identification and use of data related to life events.

To identify occurrences of life events, the data management system 102 may analyze the data being collected and stored, audio recordings of interactions between the individual and other individuals that provide services (e.g., a purpose for the data) to the individual, and/or other types of data that may include content relevant to discerning purposes (e.g., topics) that are relevant to the individual over time for which the data is stored. For example, data management system 102 may analyze an audio recording of a conversation between an individual and a healthcare provider to identify medical conditions impacting the individual. Based on this identification, data management system 102 may establish topics that are relevant to the individual, and prioritize storage of data including and/or relating to the topics (e.g., in this example, diagnosis, treatment, etc. of these medical conditions) over storage of data relating to other topics.

As new information regarding the topics becomes available, the topics and relevancy ratings (e.g., some topics may be of higher relevancy) for the topics may be updated. The onset, duration, and resolution of the medical conditions may be identified based on topics and relevancy of the topics over time. The medical and/or other types of conditions identified as impacting a person may be used as life events, and may be used to populate the timeline.

Various portions of data obtained by data management system 102 may be classified with respect to the topics. Portions of data classified for topics used as a basis for a life event (e.g., and that are contemporaneous to the life event) may be associated with the life event in the timeline. Consequently, portions of data related to different life events may be efficient identified using the timeline. Accordingly, data relevant for various purposes and uses (e.g., search) may be identified using the timeline.

Therefore, embodiments disclosed herein may address, among others, the technical challenge of data discrimination in a distributed system. The embodiments disclosed herein may address this technical challenge by establishing a specific data structure usable (e.g., timelines) to discriminate portions of data on the basis of life events. Further, by establishing the timelines on the basis of audio recordings of conversations, the cognitive burden on a user for discriminating data may be reduced. For example, the user of data management system 102 may not need to actively add context related to basis for generation of various data structures stored by data management system 102. Additionally, by automatically identifying the context related to various data structures rather than relying on human perception and/or memory regarding occurrences of events, the system may improve the accuracy of context identification through rigid enforcement of context identification processes and timely performance of context identification. In contrast, human provided context may be faulty through use of non-rigid rules and lack of timely identification (e.g., causing human perception to drift over time due to lack of mental retention of facts regarding the context).

To provide the above noted functionality, the system of FIG. 1 may include data source 100, data management system 102, data consumer 104, user device 106, and communication system 108. Each of these components is discussed below.

Figure 2A:
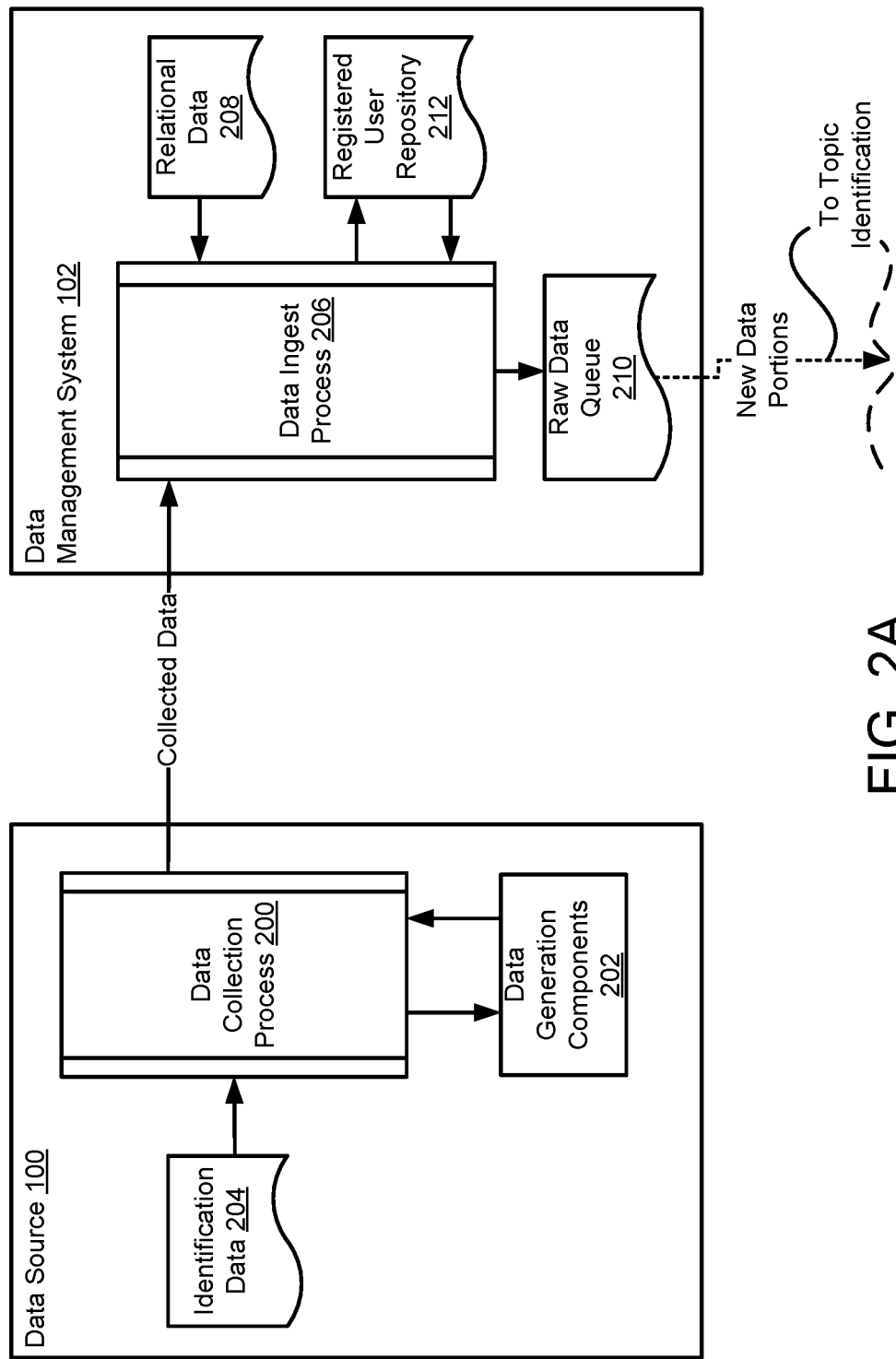
FIGS. 2A-2D and 2G show diagrams illustrating data flows in accordance with an embodiment.

Data source 100 may (i) facilitate collection and transmission of data (e.g., regarding and/or relating to an individual) to data management system 102, (ii) provide information identifying the individual or entity sourcing the data to data management system 102, and/or (iii) otherwise facilitate collection of data by data management system 102. Data source 100 may be include a system operated by a medical provider which may collect, store, and/or provide access to data for a patient or individual, a personal device that collects information about an individual (e.g., cellphone, smart watch, etc.), and/or another type of data collection device. While described with respect to a medical provider, it will be appreciated that data source 100 may provide data related to other purposes without departing from embodiments disclosed herein. Refer to FIG. 2A for additional details regarding obtaining data using data source 100.

Data source 100 may be managed by (i) an individual or a patient for which the data is being collected, (ii) professional individuals that may provide a service for an individual, and/or (iii) other individuals or entities that may provide services for an individual. For example, data source 100 may be implemented using a professional medical device and/or another device operated by a medical provider. Data source 100 may provide, for example, digitized medical test results, audio recordings of conversation (e.g., between two persons), etc.

To manage collection and storage of data, data management system 102 may (i) obtain a portion of data (e.g., from data source 100, from a data repository (not shown) within data management system, etc.), (ii) for audio data, perform a transcription process to obtain a text transcript of the audio data, (iii) perform an analysis of the text transcript of the data, (iv) based on the analysis of the text transcript, identify topics and topic rankings for the topics, (v) when a portion of data is obtained, perform a topic identification process to identify a topic classification for the portion of data, (vi) annotate the portions of data with the topic classification, (vii) store data based on the result of the storage tier selection process and the portion of data, (viii) establish timelines based on topics and rankings of the topics over time, and/or (ix) facilitate discrimination and use of data based on life events specified by the timelines. Similarly, data management system 102 may also provide access to stored data (e.g., to the individual for which the data is being managed and/or to data consumer 104). Refer to FIGS. 2B-2G for additional details regarding identifying topics, classifying data for different topics, establishing timelines, and using the timelines to facilitate use of data stored in data management system 102.

Data consumer 104 may (i) obtain limited access to selective portions of data stored in data management system 102, (ii) submit requests for access to data stored in data management system 102 by a third party or other individual, (iii) provide information identifying the individual or entity requesting access to the data and/or other types of information upon which decisions to grant access may be based, and/or (iv) once a request for access is granted (e.g., by user device 106), obtain access to data stored in data management system 102 (e.g., data for which access has been granted based on the submitted requests).

When a request is submitted to data management system 102, data management system 102 may use a timeline to identify portions of stored data relevant for servicing the request. Refer to FIG. 2G for additional information regarding use of timelines to service requests.

User device 106 may facilitate (i) access and control over data stored in data management system 102 by an individual, (ii) designation of portions of data for use by other individuals (e.g., data consumer 104), and/or (iii) performance of other management operations. User device 106 may be registered with data management system 102. For example, data management system 102 may confirm the identity of user device 106 based on a registration of the device, the registration may indicate that user device 106 is being used by the user or individual.

Figure 3:
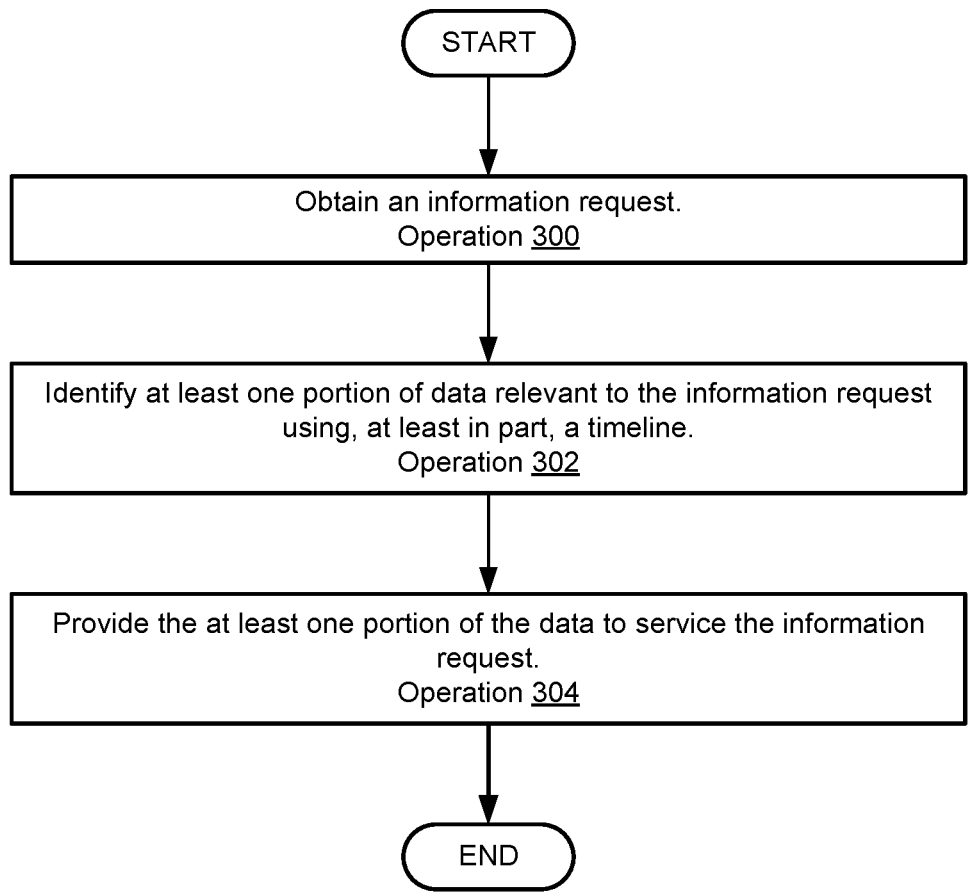
FIG. 3 shows a flow diagram illustrating a method in accordance with an embodiment.

When providing their functionality, any of data source 100, data management system 102, data consumer 104, and/or user device 106 may perform all, or a portion, of the methods shown in FIG. 3.

Any of (and/or components thereof) data source 100, data management system 102, data consumer 104, and user device 106 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 108. In an embodiment, communication system 108 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, diagrams illustrating data flows implemented by a system over time in accordance with an embodiment are shown in FIGS. 2A-2D and 2G.

Turning to FIG. 2A, a first data flow diagram illustrating data flows, data processing, and/or other operations that may be performed by the system of FIG. 1 in accordance with an embodiment is shown. In FIG. 2A, example flows between data source 100 and data management system 102 are shown. It will be appreciated that similar data flow with respect to any devices (e.g., devices that may collect and transmit data to data management system 102 such as user device 106) and data management system 102 may be present.

To provide computer-implemented services, data management system 102 may obtain and store data for an individual. Data management system 102 may obtain data from data source 100. To collect data, data source 100 may perform data collection process 200. During data collection process 200, data may be collected using data generation components 202. Data generation components 202 may include software components and/or hardware components of data source 100 necessary to perform data collection process 200.

For example, various sensors, generative, and display components of data source 100. The display components may be used to display prompts to a user of data source 100. The generative components may be used to generate various stimulations (e.g., optical, audio, etc.) of the user (e.g., so that data may be collected). The various sensors may be used to obtain information regarding the user and the impact of the stimulations on the user.

In addition, identification data 204 may be obtained during data collection process 200. Identification data 204 may include information regarding the identity of the individual for which the collected data is regarding/relating to. For example, identifying information such as the individual's name, date of birth, and/or any other identifying information for the individual for which the data is regarding. Identification data 204 may also include information regarding the identity of the user and/or entity operating data source 100. For example, identifying information such as the user's and/or entity's name, IP address, and/or any other information useful to identify the operator and/or manager of data source 100.

Identification data 204, the data collected (e.g., via data generation components 202), and/or identifying information (e.g., time stamps, cryptographic data, etc.) may be added to obtain collected data. The collected data may be provided to data management system 102. Data management system 102 may perform data ingest process 206 through which the collected data from data source 100 may be ingested.

During data ingest process 206, data management system 102 may receive and analyze the collected data using registered user data (e.g., association with the individual and/or user for which the data is regarding) from registered user repository 212 and relational data 208. Relational data 208 may specify relationships between different topic classifications of data and different individuals and/or entities that may consume the data (e.g., data consumer 104 shown in FIG. 1). Relational data 208 may be established by receiving authorization for selected individuals and/or entities from the individual for which the collected data is associated.

Data ingest process 206 may (i) identify the individual and/or entity from which the collected data is provided, (ii) identify the individual to which the collected data is to be associated, (iii) establish access controls for the collected data (e.g. using relational data 208), and/or (iv) add the collected data to raw data queue 210.

During data ingest process 206, data management system 102 may utilize the collected data (e.g., identification data 204) and registered user repository 212 to identify the user and/or individual (e.g., associated data storage for the user and/or individual) for which the collected data is regarding. Data ingest process 206 may include performing a look up using registered user repository 212 to identify the registered user and/or individual for which the collected data is to be associated. The identifier for the user and/or individual may be added to the collected data ingested by data management system 102.

To manage aggregated data received from data source 100, data management system 102 may send the collected data (including relational data 208, the identifier for the user or individual for which the collected data is regarding, and/or any other information obtained during data ingest process 206) to raw data queue 210. Raw data queue 210 may facilitate further processing of the collected data. Raw data queue 210 may be implemented as, for example, first in first out queue.

Figure 2B:
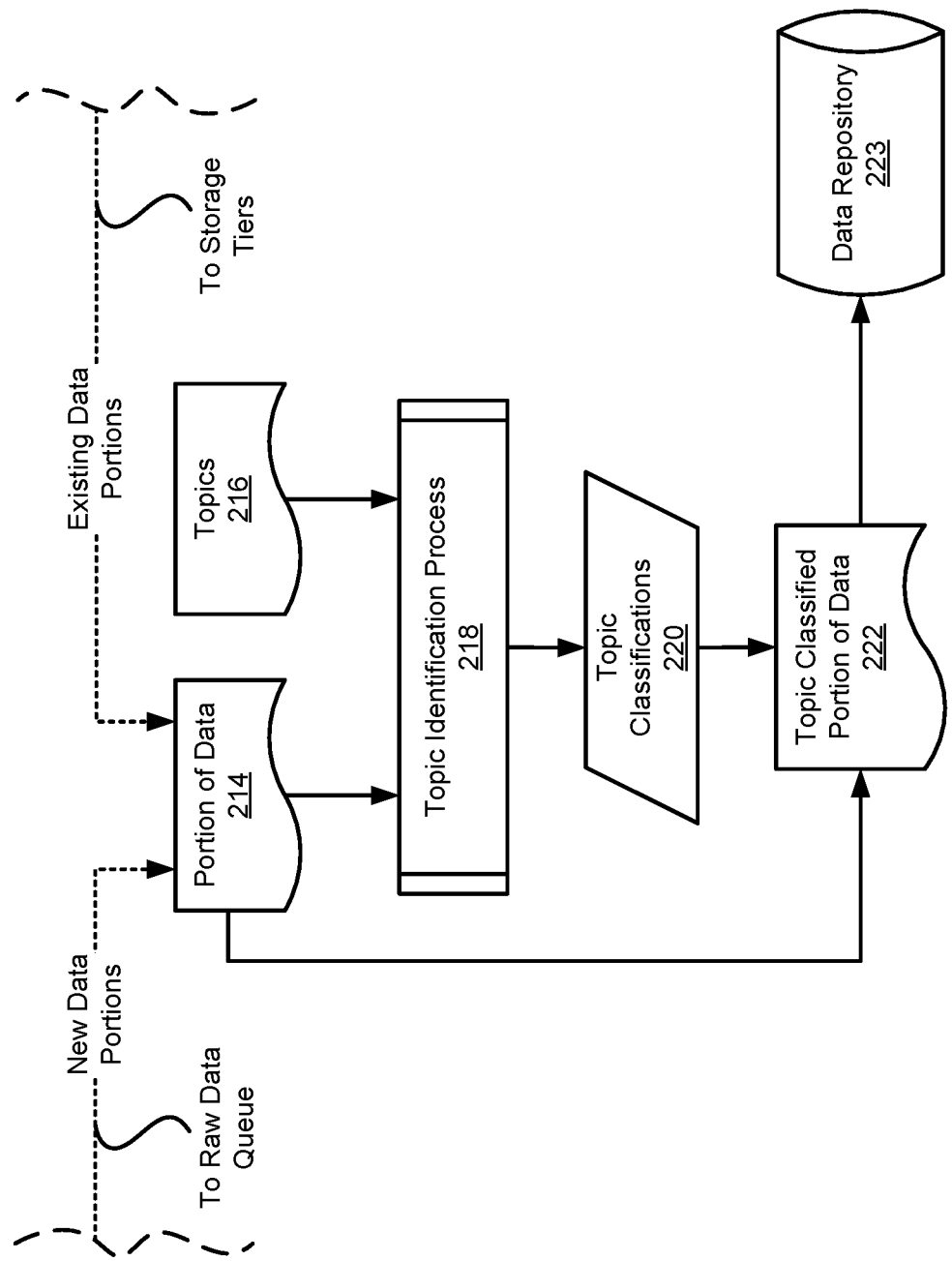

Turning to FIG. 2B, a second data flow diagram illustrating data flows, data processing, and/or other operations that may be performed by the system of FIG. 1 in accordance with an embodiment is shown. The data flows, data processing, and/or other operations may be performed when data is classified with respect to its relevancy to different topics.

As discussed above, the system may manage storage of data based on the relevancy of the data for one or more purposes with respect to an individual (e.g., for which the data is being managed and stored). To discriminate more relevant data from less relevant data, data management system 102 may classify portions of data based on topics 216 associated with the individual for which the portions of data are being stored.

Portion of data 214 may include new data portions obtained from a data source and/or existing data portions obtained from one of the storage tiers (e.g., storage tier A through storage tier N). In some instances, portion of data 214 may be obtained from data sources (and/or raw data queues within data management system 102) and may include unclassified data with respect to topic classifications that data management system 102 uses for classification purposes. For example, data management system 102 may obtain portion of data 214 (e.g., a new portion of data obtained from data source 100 via data ingest process 206 shown in FIG. 2A) from raw data queue 210 to use during topic identification process 218 (e.g., a topic classification process).

As an additional example, portion of data 214 may be an existing portion of data that has been collected, classified (e.g., with respect to topic classifications), and stored in a storage tier (e.g., any of storage tier's 246A-246N). In some instances, portion of data 214 may include an existing data portion obtained from one of the storage tiers (e.g., storage tiers A through storage tier N) for the purpose of reclassifying the existing data portion, for example, if data management system 102 identifies or otherwise obtains a new topic classification for an individual's data (e.g., a change or update to identified topics 216 previously used to classify the portion of data).

Figure 2C:
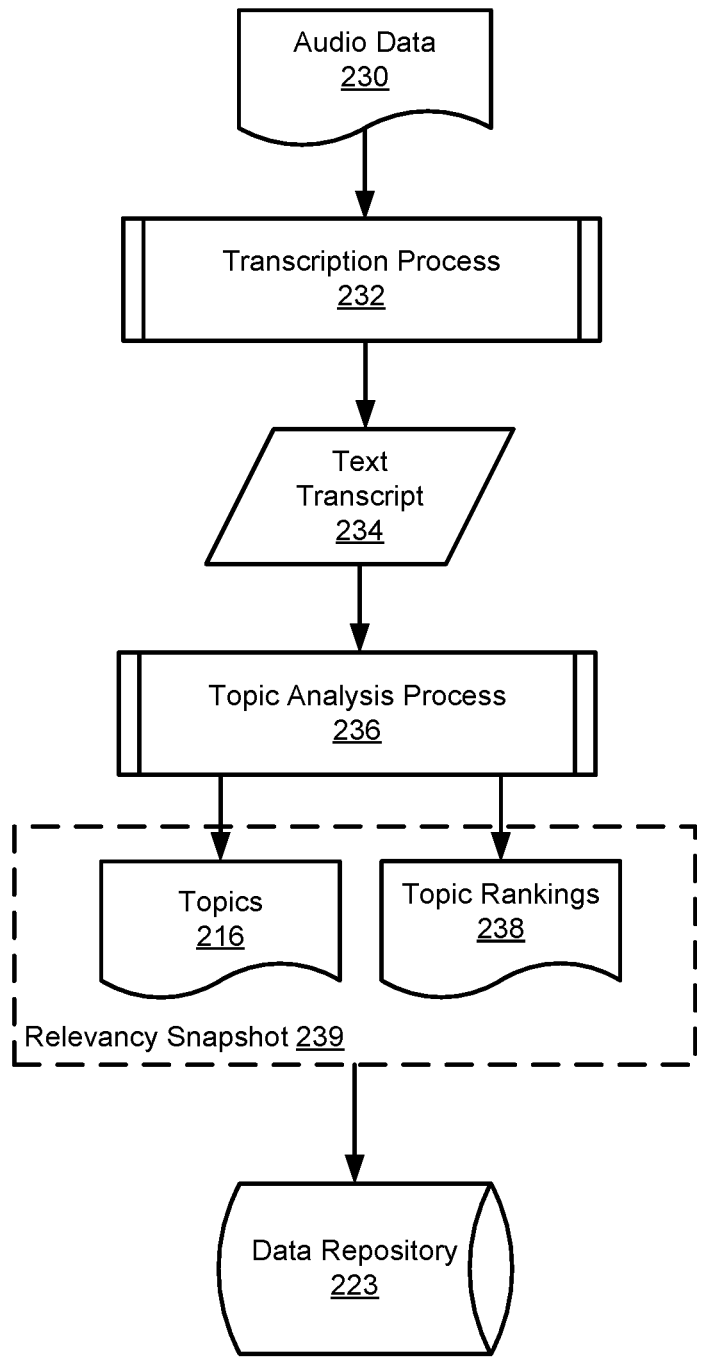

Topics 216 may include a list of identifiers associated with various topics of data (e.g., types of data with similar content and/or subject matter) which may be relevant to the individual for which the data is regarding. Refer to FIG. 2C for additional details regarding obtaining topics 216.

Topic identification process 218 may be performed to classify portion of data 214 with respect to topics specified by identified topics 216. During topic identification process 218 portion of data 214 may be analyzed to identify any of the topics specified by identified topics 216 to which portion of data 214 is relevant. For example, portion of data 214 may be analyzed using any classification process (e.g., trained machine learning models, expert rules, etc.). The result of performing topic identification process 218 may be a list of the topics (e.g., topic classifications 220) from identified topics 216 to which portion of data 214 is relevant.

Through topic identification process 218, topic classifications 220 for the portion of data 214 may be obtained. Topic classifications 220 may include the list of topics. Topic classifications 220 may be used as metadata for portion of data 214 so that the topics for which the portion of data 214 may be efficiently identified in the future.

Topic classifications 220 may be used to efficiently allow topics for which portion of data 214 is relevant to be identified. Topic classifications for the portion of data 214 may include information identifying the topics for which portion of data 214 is relevant. For example, topic classifications 220 may include one or more identifiers for the topics.

Topic classifications 220 may be used to obtain topic classified portion of data 222. Topic classified portion of data 222 may include the identified topic classifications (e.g., topic classification 220) for the portion of data and the portion of data (e.g., portion of data 214). For example, topic classified portion of data 222 may include one or more identifiers for the topics (e.g., identified via topic identification process 218) and portion of data 214. Topic classified portion of data 222 may be used, for example, to service future information requests. Refer to FIG. 2G for additional details regarding servicing information requests.

Topic classified portion of data 222 may be stored in data repository 223. Thus, through the flow shown in FIG. 2B, any number of portions of data (e.g., medical test results, other types of data) may be classified with respect to topics.

As portions of data are, for example, reclassified over time, the previous topic classifications may be retained. For example, time stamped topic classifications may be added to data repository 223 over time for a given portion of data. Thus, the topic classifications over time for the portion of data may be available for future use. As will be discussed below, the topics classifications may be used to identify relationships between life events and portions of data.

To facilitate classifications of data, the topics may be identified through analysis processes of conversations between a person for which the portions of data is collected, and other persons.

Turning to FIG. 2C, a third data flow diagram illustrating data flows during that may occur while topics and topic rankings are obtained in accordance with an embodiment is shown.

As discussed above, to discriminate more relevant data from less relevant data, data management system 102 may analyze the data being collected and stored on behalf of an individual to identify types of data (e.g., topics) relevant to each respective individual.

The data being collected and stored in data management system 102 may include audio recordings of interactions (e.g., conversations) between an individual and other individuals that provide services (e.g., a purpose for the data) to the individual and/or other types of data that may include content relevant to discern purposes (e.g., topics) relevant to the individual for which the data is being collected and stored. The collected data (e.g., received from data source 100 via data ingest process 206 shown in FIG. 2A) may include audio data 230 (e.g., audio files). Audio data 230 may include an audio recording of a conversation between a patient and a medical provider in which the two people discuss diagnosis, treatment, etc. for a particular type of medical condition such as diabetes, or other types of service providers.

In order to analyze audio data 230, the system may perform transcription process 232 through which audio data 230 may be analyzed and transcribed to obtain text transcript 234. Transcription process 232 may be performed by an inference model (not shown), artificial intelligence model (AI model), and/or any data processing system trained to perform natural language processes such as converting audio and/or voice data to text data (e.g., speech recognition process). For example, audio data 230 may be ingested by an inference model through which audio data 230 is analyzed and transcribed into a text format (e.g., text transcript 234).

Once text transcript 234 is obtained, topic analysis process may be performed in order to obtain relevant topics for the data associated with an individual (e.g., topics 216) and a ranking order for the topics (e.g., topic rankings 238). Topic analysis process 236 may include analyzing text transcript 234 to identify topics (e.g., a defined group or category of data) included in the data and establishing a relevancy rating for each topic (e.g., topic rankings 238). Topic rankings 238 may be based on the frequency of each topic (e.g., number of occurrences) identified in the data and/or on the opinion polarity (e.g., positive, neutral, negative, etc.) of each topic identified in the data. Topic rankings 238 may include identifiers for each topic classification and an assigned value (e.g., ranking order) for each of topics 216.

Topic analysis process 236 may be performed by ingesting text transcript 234, for example, in an AI model (not shown) trained to perform text classification (e.g., topic labelling, sentiment analysis, etc.) of the data and to assign a rank order for each topic classification (e.g., identified via text classification). For example, an AI model may analyze text data (e.g., text transcript 234) regarding medical diagnosis, treatment, etc. for an individual and identify features (e.g., certain group of text or words) related to diabetes (e.g., a topic). As such, the AI model may establish the topic of diabetes to be relevant to the individual and assign a relevancy value to the topic of diabetes (e.g., topic rankings 238).

Identified topics 216 and topic rankings 238 may be stored in a data repository (not shown) within data management system 102 and may be updated as new data is collected (e.g., audio data 230). Continuing with the above example, data management system 102 may obtain and analyze additional audio data in which identifies a new topic (e.g., such as a new medical condition) of the data and assigns a higher relevancy value (e.g., topic ranking) to the new topic than compared to the topic of diabetes.

Each time that topic analysis process 236 is performed, a relevancy snapshot (e.g., 239) may be obtained. The relevancy snapshot may include the topics and topic rankings based on the analysis, and context information such as when the audio data upon which the analysis based was obtained, when the analysis was performed, etc. These resulting relevancy snapshots 239 may be used to identify life events.

Figure 2D:
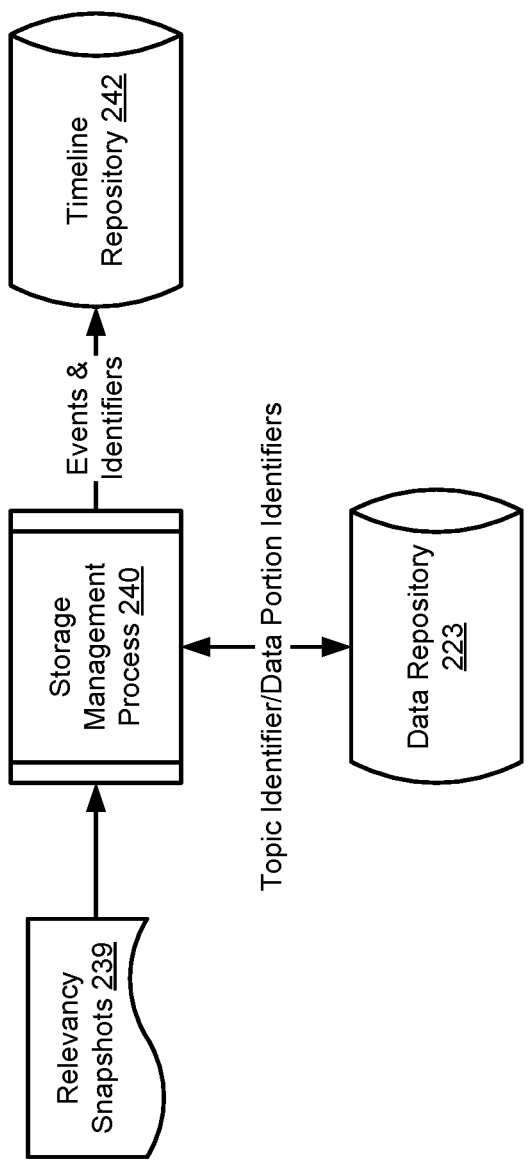

Turning to FIG. 2D, a fourth data flow diagram in accordance with an embodiment is shown. The data flow shown in FIG. 2D may occur when a timeline is updated.

As discussed above, to enrich the data stored in data repository 223, a timeline may be established. The timeline may facilitate discrimination of portions of data in data repository 223 for various purposes.

When relevancy snapshots (e.g., 239) are obtained, the snapshots may be ingested by storage management process 240. During storage management process 240, the relevancy snapshot may be analyzed (e.g., in combination with other relevancy snapshots) to update a timeline for a person. The timeline may be updated by, for example, adding occurrences of new events to the timeline. The events may be associated with various portions of data, thereby allowing the events to serve as keys usable to identify portions of data from data repository 223 that are associated with the corresponding events.

Figure 2E:
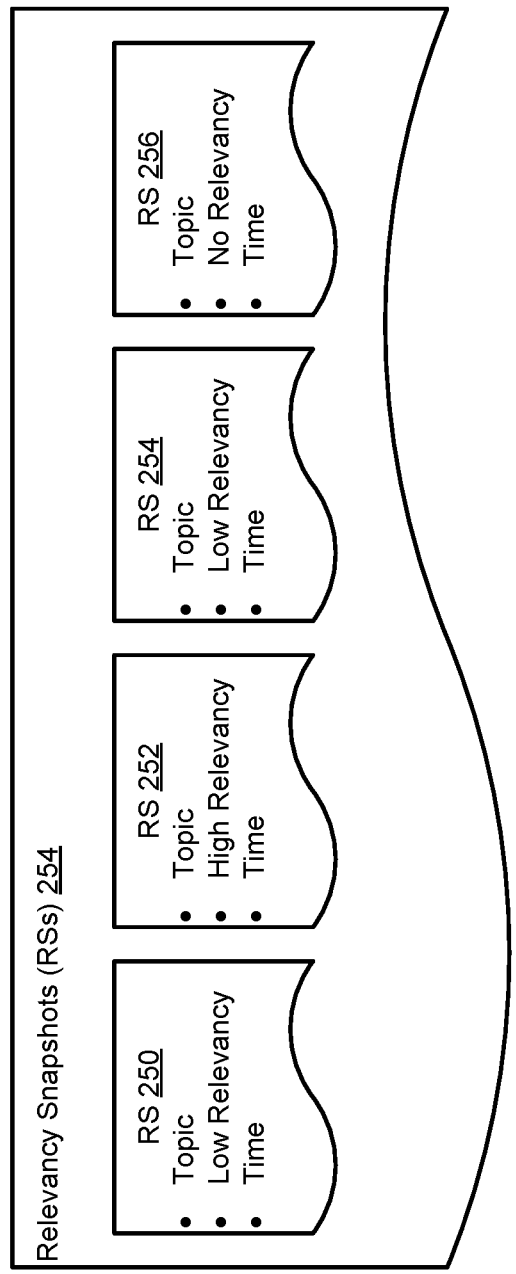
FIGS. 2E-2F show data structure diagrams in accordance with an embodiment.

To update the timeline, a relevancy snapshots may be analyzed to identify (i) when relevancy of a topic first begins, (ii) the relevancy of the topic over time, and (iii) when the topic is no longer relevant to user. Refer to FIG. 2E for additional details regarding analysis of snapshots to identify topic relevancy over time.

The relevancy of the topic over time may be used to define and add an event to a timeline. The event may be defined based on the topic and/or data classified for the topic.

For example, consider an example scenario where the topic is abdomen and various pieces of data classified as being relevant to the topic abdomen are obtained. The topic of abdomen may have been identified from a conversation where a patient complained to a doctor about abdomen pain. The content of the pieces of data may be analyzed, for example, to identify commonalities of the content. In this example scenario, the pieces of data may include results of medical tests related to kidney function of the patient. The resulting event may be based on the topic and commonality, in this example, the two terms may be concatenated to obtain the event of "abdomen: kidney".

Based on the above analysis and in this example, an event "abdomen: kidney" may be added to the timeline. It will be appreciated that the analysis of the data classified for the topic may yield multiple items of information. Consequently, the resulting events may be of significant length.

Figure 2F:
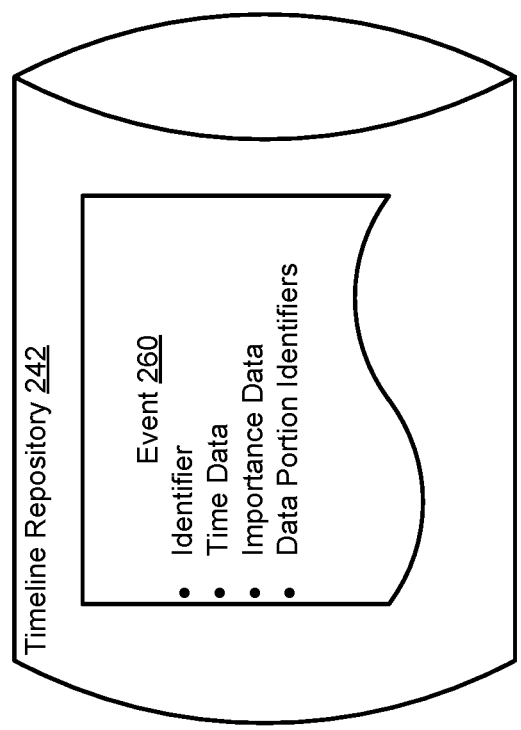
Figure 2G:
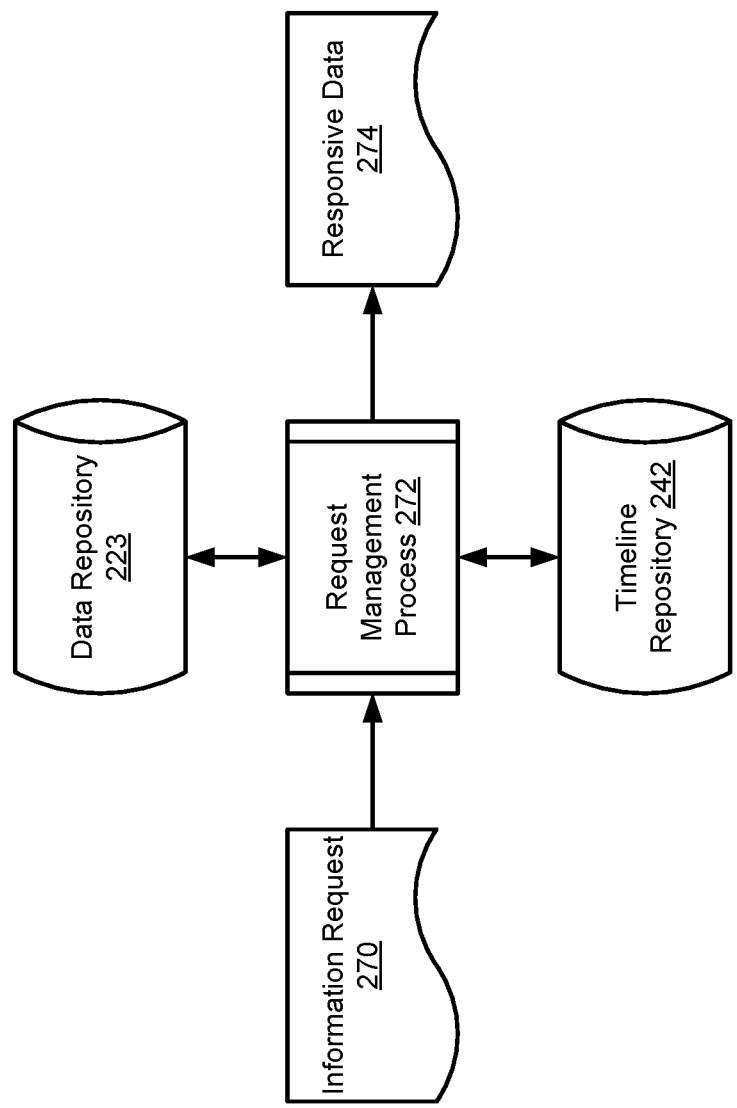

To enable this event to be usable for data discrimination purposes, associations between the event and portion of data may be established. To establish the association, data repository 223 may be searched for portions that are classified for the topic abdomen (and/or are contemporaneous with the topic abdomen, may be discriminated based on the time stamp added along with the topics and portions of data, as discussed with respect to FIG. 2B). Identifiers for the searched for portions of data may be added as metadata, fields in entries in a database, etc. along with the events in the timeline. Thus, when an event is identified, the portions of data associated with the event may be identified. The aforementioned events and identifiers may be stored, for example, in timeline repository 242. Timeline repository 242 may store any number of events thereby establishing a historical timeline of life events for a person. Refer to FIG. 2F for additional details regarding timeline repository 242.

In addition to the events, information regarding the events may be stored. For example, the information may include when the events started, when the events ended, and levels of importance of the events over time. The relevant levels of importance may be based on the topic relevancy of the corresponding topic over time. Refer to FIG. 2E for additional information regarding establishing the levels of importance of the events over time.

Turning to FIG. 2E, a first data structure diagram in accordance with an embodiment is shown. The first data structure diagram may illustrate an example of relevancy snapshots (e.g., 254) in accordance with an embodiment.

To identify when a life event has occurred, any number of RSs 254 may be reviewed to identify a subset of the RSs that each include a common topic. For example, the topic may be abdomen.

Each (e.g., 250, 252, 254, 256) of the relevancy snapshots that include the common topic may be associated with different points in time, and may ascribe different relevancy levels to the common topic. Returning to the example of abdomen, a first RS may include the topic of relevancy because during a first conversation a patient complained of abdomen pain to a doctor. Over time and in different subsequent conversations, the doctor and patient may discuss the abdomen pain. In these different conversations, the number of times abdomen pain was uttered may be more or less, thereby causing the corresponding RSs based on the conversations to ascribe different relevancy rankings to the topic of abdomen.

The relevancy for the topic at the points in time associated with each RS may be used as the basis a level of importance over time for an event based on RSs 254. Thus, the importance may increase and decrease based on the level of relevancy of the abdomen topic.

The event corresponding to RSs 254 may be an assigned a start and end based on the points in time associated with the RSs. For example, the time of the conversation corresponding to the earliest RS (e.g., 250 in this example) may be used as the start of the life event, and the time of the conversation corresponding to the latest RS (e.g., 256 in this example) may be used as the end of the life event.

Thus, the resulting life event may have a duration that includes the points in time associated with RSs 254, and may have a varying level of time over the duration that is proportional to or otherwise based on the relevancy ranking that each RS ascribes to the topic. For example, as seen in FIG. 2E, RS 250 may ascribe a low relevancy ranking to the topic abdomen, with the other RSs ascribing high, low, and no relevancy to the topic of abdomen. Consequently, the corresponding life event that may be added to the timeline may ascribe a level of importance to the life event that varies in a similar manner (e.g., low, high, low, irrelevant).

Turning to FIG. 2F, a second data structure diagram in accordance with an embodiment is shown. The second data structure diagram may illustrate an example of timeline repository 242 in accordance with an embodiment.

To enrich stored data, timeline repository 242 may include any number of events (e.g., 242—illustrated in FIG. 2F with one event for conciseness, may include any number of events). Each event may be implemented, for example, as an entry isn a database.

Each event may include (i) an identifier that identifies the event, (ii) time data reflecting a start, duration, and end of the event, (iii) importance data that indicates the importance of the event over time, and (iv) data portion identifiers. The aforementioned information regarding each event may facilitate contextualization of portions of stored data and use of the stored data.

For example, each event may provide a basis for why some portions of data were collected. Returning to the previous example, if an event was "abdomen: kidney", this event may contextualize the portions of data identified by the data portion identifies of the event. Consequently, a potential user of the portions of data may understand the reason why the data was collected, rather than leaving the potential user with no information regarding why the data was originally collected.

Additionally, the time and importance of data may provide further context clues regarding the portions of data identified by the data portion identifies.

Further, the event may be used to facilitate discrimination of data for future uses. Refer to FIG. 2G for additional information regarding how events may be used to discriminate data for different uses.

Turning to FIG. 2G, a fifth data flow diagram in accordance with an embodiment is shown. The data flow shown in FIG. 2G may occur when an information request is obtained.

An information request (e.g., 270) may be issued, for example, by a data consumer. The information request may include search terms and/or data regarding information desired by an issuer of the information request. For example, a doctor may issue an information request to the data management system to attempt to obtain information relevant to perform a diagnosis or other medical service for a person for which the data management system stores data associated with the person.

When information request 270 is obtained, request management process 272 may be performed. During request management process 272, information request 270 may be processed to attempt to identify data stored by the management system that is relevant to the information request. For example, search terms and/or other data from the information request may be used to search for relevant data.

To perform the search, the search terms may be used to search timeline repository 242 for events corresponding to the search terms. Any type of algorithm may be used to identify events corresponding to the search terms. For example, similarity analysis, inferencing, and/or other types of data processing operations may be performed to match the search terms to one or more events. Any of the hit events may be eliminated by various parameters attached to the search terms. The parameters may relate, for example, to periods of time (e.g., may discriminate events on the basis of when they occurred), level of importance, etc. Thus, the initially hit events may be reduced by filtering out some of the events.

The remaining hit events may be used to identify portions of data. For example, the data portion identifiers from the events may be used to identify portions of data in data repository 223. The identifiers and/or corresponding portions of data may be used to provide responsive data 274 to an entity that issued information request 270.

Responsive data 274 may include, for example, (all or a portion of) the identifiers of the portions of data, the portions of data, other information (e.g., summaries) based on the identifiers and/or the portions of data, and/or other types of information based on the events identified based on information request 270.

Thus, using the flow shown in FIG. 2G, information relevant to information requests may be identified and used to service the information requests.

As discussed above, the components of FIGS. 1-2G may perform various methods to manage operation of data processing systems. FIG. 3 illustrates a method that may be performed by the components of the system of FIGS. 1-2G. In the diagram discussed below and shown in FIG. 3, any of the operations may be repeated, performed in different orders, omitted, and/or performed in parallel with or in a partially overlapping in time manner with other operations.

Turning to FIG. 3, a flow diagram illustrating a method for servicing information requests in accordance with an embodiment is shown. The method may be performed, for example, by any of data source 100, data management system 102, data consumer 104, user device 106, and/or other components of the system shown in FIGS. 1-2G.

At operation 300, an information request is obtained. The information request may be obtained by (i) receiving it from another device, (ii) reading it from storage, (iii) generating it based on user input and/or other data, and/or via other methods.

The information request may include search terms, limiters, and/or other information usable to discriminate relevant data from irrelevant data.

At operation 302, at least one portion of data relevant to the information request is obtained using, at least in part, a timeline. The at least one portion of data may be obtained by (i) using the information request to identify one or more events from the timeline, (ii) obtaining identifiers of portions of stored data from the events, and/or (iii) using the identifiers to read the portions of data.

At operation 304, at least one portion of the data is provided to service the information request. The at least one portion of the data may be provided by sending the data to an entity that issued the information request via a message, or other communication process.

The method may end following operation 340.

Using the methods illustrated in FIG. 3, embodiments disclosed herein may facilitate identification and use of stored data. The data may be used through use of a timeline that associates life events of a person with portions of data.

Figure 4:
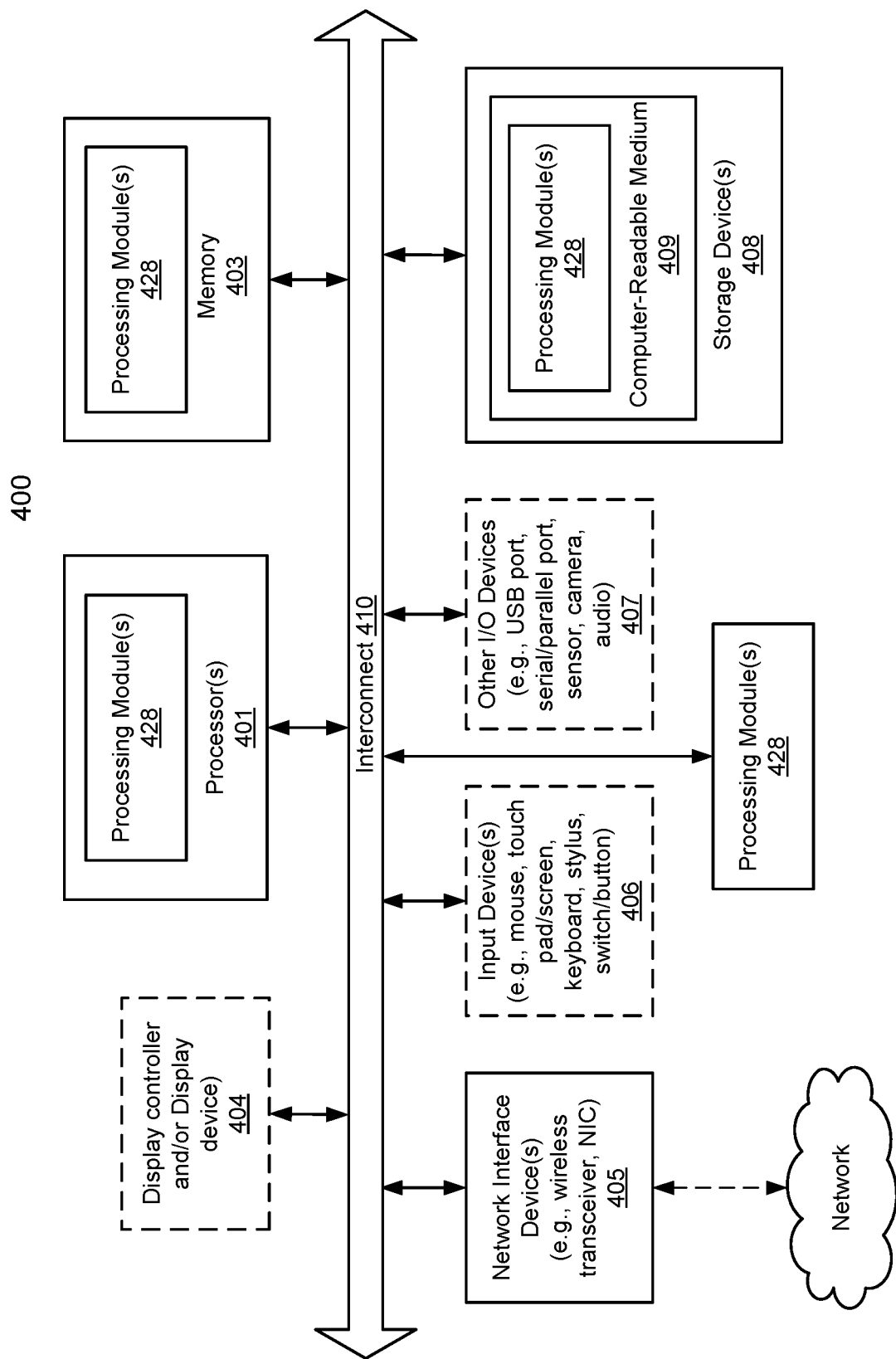
FIG. 4 shows a block diagram illustrating a data processing system in accordance with an embodiment.

Any of the components illustrated in FIGS. 1-2G may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like.

More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A data processing system, comprising:
   a processor; and
   a memory coupled to the processor to store instructions, which when executed by the processor, cause the processor to perform operations for managing use of data stored in a storage system for a user of the storage system, the operations comprising:
   obtaining an information request;
   identifying at least one portion of the data that is relevant to the information request using, at least in part, a timeline that associates portions of the data with past life events related to the user, wherein the timeline comprises an entry for one of the past life events, and the entry comprises, at least:
      time data for the one past life event, the time data indicating a start, duration, and end of the one past life event and being based on at least two relevancy snapshots that are each associated with different points in time; and
      importance data that indicates a change in an importance of the one past life event over the start, duration, and end of the one past life event, and
   wherein the timeline is generated based on topic classifications generated for the data, the topic classifications being generated by, at least:
      generating a first set of topics based on the data using a classification model hosted by the storage system;
      identifying conversation topics in at least one conversation between the user and at least one other individual to generate a second set of topics for the data, the data being associated with the at least one conversation, and a first of the at least two relevancy snapshots comprises:
         the second set of topics, and
         relevancy rankings for the second set of topics, the change in the importance of the one past life event over the start, duration, and end of the one past life event being based on the relevancy rankings for the second set of topics, wherein the topic classification share the relevancy rankings of the second set of topics; and
      using topics from the first set of topics that are also in the second set of topics as the topic classifications, the one past life event being selected based on a topic classification from among the topic classifications that comprises a highest level of relevancy to the user;
   using the at least one portion of the data to service the information request; and using the one past life event to collect additional data for the user from data sources external to the storage system to update the timeline, the additional data being associated with the user and includes the topic classification that comprises the highest level of relevancy to the user.

2. The data processing system of claim 1, wherein the further comprises:
identifiers of a sub-portion of the portions of the data, the sub-portion being associated with the one of the past life events, and the identifiers specifying one or more locations within a database where the sub-portion of the portions of the data is stored.

3. The data processing system of claim 1, wherein the second set of topics are based at least in part on an audio transcript, the audio transcript being based on an audio file, the audio file comprising audio data based on the at least one conversation.

4. The data processing system of claim 3, wherein the second set of topics comprise an enumeration of each unique topic of discussion topics during the at least one conversation.

5. The data processing system of claim 4, wherein the relevancy rankings are based on a number of time each topic of the second set of topics occurred during the at least one conversation.

6. The data processing system of claim 1, wherein the one past life event is based on the at least two relevancy snapshots, and the time data specifies a period of time on the different points in time.

7. The data processing system of claim 1, wherein the information request comprises a search query, and the search query is used to discriminate at least one of the past life events during the identifying of the at least one portion of the data.

8. A method for managing use of data stored in a storage system for a user of the storage system, the method comprising:
obtaining an information request;
identifying at least one portion of the data that is relevant to the information request using, at least in part, a timeline that associates portions of the data with past life events related to the user, wherein the timeline comprises an entry for one of the past life events, and the entry comprises, at least:
time data for the one past life event, the time data indicating a start, duration, and end of the one past life event and being based on at least two relevancy snapshots that are each associated with different points in time; and
importance data that indicates a change in an importance of the one past life event over the start, duration, and end of the one past life event, and
wherein the timeline is generated based on topic classifications generated for the data, the topic classifications being generated by, at least:
generating a first set of topics based on the data using a classification model hosted by the storage system;
identifying conversation topics in at least one conversation between the user and at least one other individual to generate a second set of topics for the data, the data being associated with the at least one conversation, and a first of the at least two relevancy snapshots comprises:
the second set of topics, and
relevancy rankings for the second set of topics, the change in the importance of the one past life event over the start, duration, and end of the one past life event being based on the relevancy rankings for the second set of topics, wherein the topic classification share the relevancy rankings of the second set of topics; and
using topics from the first set of topics that are also in the second set of topics as the topic classifications, the one past life event being selected based on a topic classification from among the topic classifications that comprises a highest level of relevancy to the user;
using the at least one portion of the data to service the information request; and
using the one past life event to collect additional data for the user from data sources external to the storage system to update the timeline, the additional data being associated with the user and includes the topic classification that comprises the highest level of relevancy to the user.

9. The method of claim 8, wherein the entry further comprises:
identifiers of a sub-portion of the portions of the data, the sub-portion being associated with the one of the past life events, and the identifiers specifying one or more locations within a database where the sub-portion of the portions of the data is stored.

10. The method of claim 8, wherein the second set of topics are based at least in part on an audio transcript, the audio transcript being based on an audio file, the audio file comprising audio data based on the at least one conversation.

11. The method of claim 10, wherein the second set of topics comprise an enumeration of each unique topic of discussion topics during the at least one conversation.

12. The method of claim 11, wherein the relevancy rankings are based on a number of time each topic of the second set of topics occurred during the at least one conversation.

13. The method of claim 8, wherein the one past life event is based on the at least two relevancy snapshots, and the time data specifies a period of time based on the different points in time.

14. The method of claim 8, wherein the information request comprises a search query, and the search query is used to discriminate at least one of the past life events during the identifying of the at least one portion of the data.

15. A non-transitory machine-readable medium having instructions stored therein, which when executed by a processor, cause the processor to perform operations for managing use of data stored in a storage system for a user of the storage system, the operations comprising:
obtaining an information request;
identifying at least one portion of the data that is relevant to the information request using, at least in part, a timeline that associates portions of the data with past life events related to the user, wherein the timeline comprises an entry for one of the past life events, and the entry comprises, at least:
time data for the one past life event, the time data indicating a start, duration, and end of the one past life event and being based on at least two relevancy snapshots that are each associated with different points in time; and
importance data that indicates a change in an importance of the one past life event over the start, duration, and end of the one past life event, and wherein the timeline is generated based on topic classifications generated for the data, the topic classifications being generated by, at least:

generating a first set of topics based on the data using a classification model hosted by the storage system;

identifying conversation topics in at least one conversation between the user and at least one other individual to generate a second set of topics for the data, the data being associated with the at least one conversation, and a first of the at least two relevancy snapshots comprises:

the second set of topics, and relevancy rankings for the second set of topics, the change in the importance of the one past life event over the start, duration, and end of the one past life event being based on the relevancy rankings for the second set of topics, wherein the topic classification share the relevancy rankings of the second set of topics; and using topics from the first set of topics that are also in the second set of topics as the topic classifications, the one past life event being selected based on a topic classification from among the topic classifications that comprises a highest level of relevancy to the user;

using the at least one portion of the data to service the information request; and using the one past life event to collect additional data for the user from data sources external to the storage system to update the timeline, the additional data being associated with the user and includes the topic classification that comprises the highest level of relevancy to the user.

16. The non-transitory machine-readable medium of claim 15, wherein the entry further comprises:

identifiers of a sub-portion of the portions of the data, the sub-portion being associated with the one of the past life events, and the identifiers specifying one or more locations within a database where the sub-portion of the portions of the data is stored.

17. The non-transitory machine-readable medium of claim 15, wherein the second set of topics are based at least in part on an audio transcript, the audio transcript being based on an audio file, the audio file comprising audio data based on the at least one conversation.

18. The non-transitory machine-readable medium of claim 17, wherein the second set of topics comprises an enumeration of each unique topic of discussion topics during the at least one conversation.

19. The non-transitory machine-readable medium of claim 18, wherein the relevancy rankings are based on a number of time each topic of the second set of topics occurred during the at least one conversation.

20. The non-transitory machine-readable medium of claim 15, wherein the one past life event is based on the at least two relevancy snapshots, and the time data specifies a period of time based on the different points in time.

* * * * *

UNITED STATES PATENT AND TRADEMARK OFFICE
CERTIFICATE OF CORRECTION

PATENT NO. : 12,282,489 B2
APPLICATION NO. : 18/458395
DATED : April 22, 2025
INVENTOR(S) : Prem Pradeep Motgi, Dharmesh M. Patel and Manpreet Singh Sokhi Page 1 of 1

It is certified that error appears in the above-identified patent and that said Letters Patent is hereby corrected as shown below:

In the Claims

Claim 1, Column 18, Line 58, the word "classification" should instead be -- classifications --.

Claim 2, Column 19, Lines 7-8, the phrase "wherein the further comprises" should instead be -- wherein the entry further comprises --.

Claim 6, Column 19, Lines 29-30, the phrase "a period of time on the different points in time" should instead be -- a period of time based on the different points in time --.

Claim 8, Column 20, Lines 3-4, the word "classification" should instead be -- classifications --.

Claim 15, Column 21, Lines 17-18, the word "classification" should instead be -- classifications --.

Signed and Sealed this
Twenty-fourth Day of June, 2025

Coke Morgan Stewart
*Acting Director of the United States Patent and Trademark Office*